UNITED STATES PATENT OFFICE.

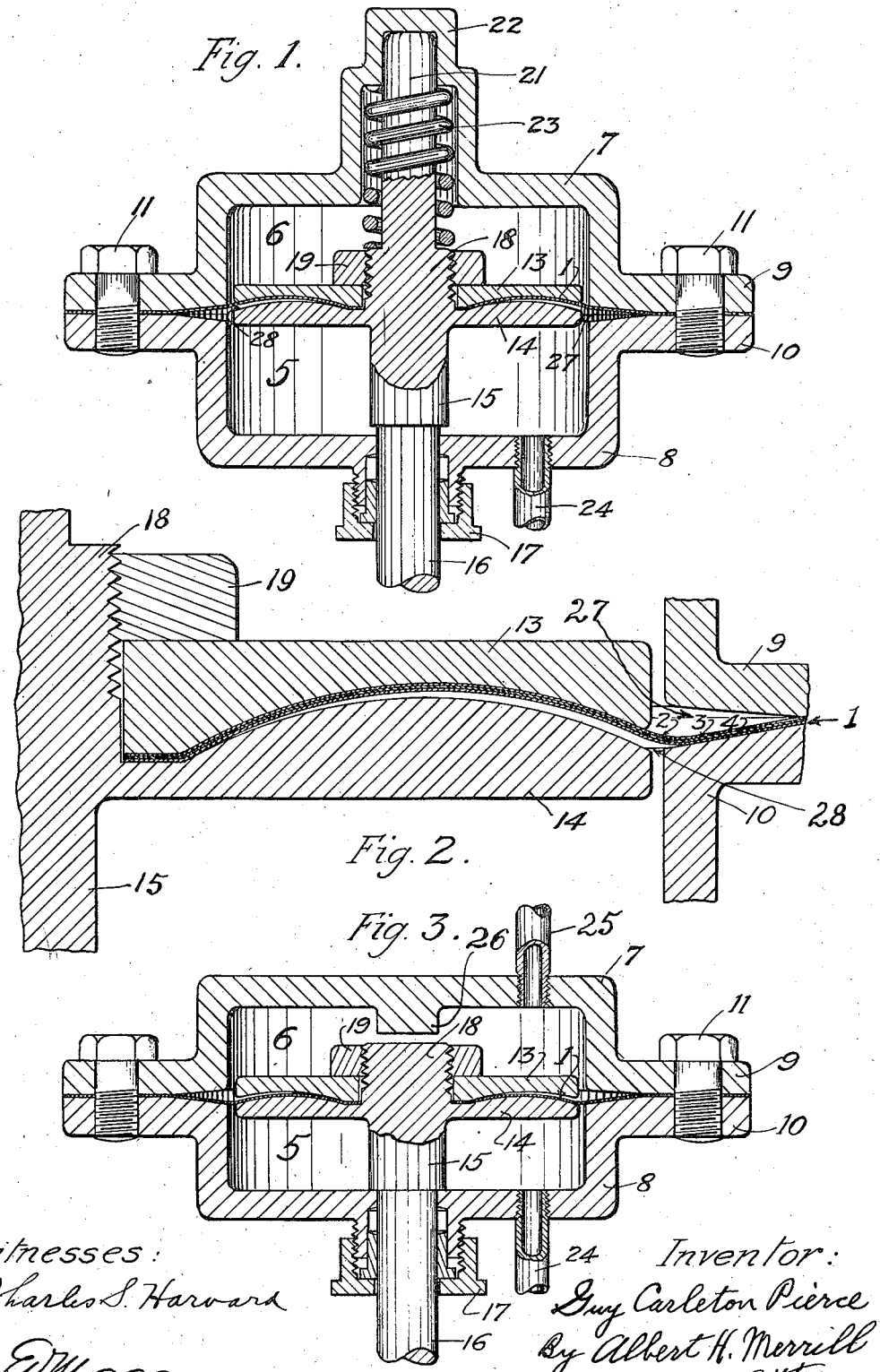

GUY CARLETON PIERCE, OF LOS ANGELES, CALIFORNIA, ASSIGNOR TO CALIFORNIA VALVE AND AIR BRAKE COMPANY, OF LOS ANGELES, CALIFORNIA, A CORPORATION OF CALIFORNIA.

MEANS FOR FORMING AND SUPPORTING DIAPHRAGMS.

1,062,300.           Specification of Letters Patent.           Patented May 20, 1913.

Application filed April 18, 1912. Serial No. 691,769.

*To all whom it may concern:*

Be it known that I, GUY CARLETON PIERCE, a citizen of the United States, residing in the city of Los Angeles, State of California, have invented a new and useful Means for Forming and Supporting Diaphragms, of which the following is a specification.

This invention relates to means for forming and supporting a diaphragm designed particularly for use in the triple valves of air brakes, but by no means limited to such use.

An object of the invention is safely to guard against the diaphragm ever being bent into reverse curves and therefore to prevent premature crystallization and rupture of the metal during operation.

The diaphragm forming means of this invention, is adapted to properly produce the initial forming of a diaphragm by mechanical compression during the time of assembling, said means being also adapted to act as a former or die to complete the design or form of a diaphragm by the further use of fluid under pressure.

An object of this invention is so to form, construct and support a diaphragm that the lines and form given it by the act of assembling and initial applications of fluid pressure will be permanently retained during subsequent operations; to so space the diaphragm former and supporter as to secure the maximum travel of the diaphragm and its supporter without rupturing the metal of the diaphragm; and so to support the diaphragm as to secure an extended hinge effect therefor during operation, thereby preventing abrupt bending of the diaphragm at any point during operation under whatever conditions.

A further object of this invention is to secure a diaphragm that will not change in tension over a great range of temperature.

A still further object is to produce a diaphragm that will serve as a gasket that will withstand removing and assembling a greater number of times than rubber, or other material commonly used for such purposes.

A diaphragm constructed according to the principles of this invention will wear for a long period of time even when subjected to heavy strain and frequent operation, and this desirable result can be obtained even when the diaphragm is made of soft metal of a thickness of one two-hundredth of an inch.

The diaphragm may be constructed of a single sheet of metal or other material, or it may be constructed of a plurality of such sheets. In applying the diaphragm to the triple valves of air brakes it is preferable to construct the diaphragm of from two to four sheets of thin annealed copper, each sheet being desirably of 34 or 36 B. S. standard gage.

A diaphragm thus constructed will produce excellent results when assembled in combination with a triple valve of the character described in the patent granted to S. G. Neal December 26, 1911, No. 1,012,694.

Rubber diaphragms deteriorate when exposed to oil and water, but such diaphragms have hitherto necessarily been employed in triple valves for the reason that the required number of operations could not be obtained with metallic diaphragms having the desired travel, without rupturing the metal, because of the amount of flexion required. By this invention a supporting device is provided which makes it possible to use metallic diaphragms in relations where an amount of flexion is required, which has hitherto precluded the use of such diaphragms.

Although metal diaphragms are greatly to be preferred, the invention is applicable to a diaphragm made of rubber or other material. The life of rubber diaphragms can be greatly increased by supporting the same as provided for by this invention.

Referring to the accompanying drawings which illustrate the invention, Figure 1 is a vertical mid-section of a diaphragm chamber and a diaphragm mounted therein in an operative position; Fig. 2 is an enlarged reproduction of a portion of Fig. 1, illustrating the diaphragm in a different operative position and as composed of a plurality of superimposed sheets of metal; Fig. 3 is a vertical mid-section of a diaphragm chamber and diaphragm, the chamber being constructed somewhat differently from the chamber shown in Fig. 1, but the diaphragm supporting parts being the same, the latter, however, occupying a still different operative position.

Referring in detail to the drawings, the diaphragm proper 1 shown in Fig. 1 of the drawings, may be regarded as formed of a single sheet of metal or as of several sheets 2, 3 and 4 of metal, as shown in Fig. 2. Said diaphragm 1 divides the diaphragm chamber into a lower compartment 5 and an upper compartment 6, the casing consisting of an upper cap 7 and a lower cap, or container, 8. These two parts 7 and 8 are respectively provided with circular flanges 9 and 10 secured together by a series of capscrews 11, the diaphragm 1 being clamped between said flanges.

The central portion of the diaphragm 1 is clamped between an upper forming and supporting member 13 and lower forming and supporting member 14, said members 13 and 14 having the general form of a pair of disks with curved faces which spoon into each other. The lower member 14 is preferably formed as part of a head 15, carried by the operating rod 16, said operating rod playing through a stuffing box 17. In practice said operating rod 16 will be used to operate the triple valves of air brakes, or for other purposes.

The upper supporting member 13 preferably is a disk having a central aperture which receives the threaded upper portion 18 of the head 15, a clamping nut 19 being screwed onto said portion to clamp the upper supporting member 13 against the diaphragm. The head 15 is also provided with an upwardly extending stem 21 which travels within a guiding dome 22. A compression spring 23 engages the portion 18 of the head normally to hold the parts in the depressed position to cause the lower end of the head 15 to engage the lower wall of the member 8. Fluid pressure is introduced to chamber 5 through the inlet pipe 24.

In Fig. 3 is shown a slightly modified form of the device. In this view, the compression spring 23 of Fig. 1 is dispensed with and its function is performed by fluid pressure admitted through pipe 25. The cap 7 is provided with an internal boss 26 which forms a stop against which the head 18 strikes to limit the upward movement of the diaphragm supports.

The diaphragm is formed and the parts are assembled in the following manner: Before the cap 7 is put in place, the operating rod 16 and head 15 are put into operative position, together with the member 14 that forms a part of said head. The diaphragm 1 is then laid on top of the lower forming member 14, said diaphragm being provided with an aperture to permit the same to be fitted over the extension 18 of the head. The diaphragm is at this time in a perfectly flat condition. After the diaphragm is thus laid in place, the member 13 is placed thereover and nut 19 is clamped down upon said member 13 to make an air tight fit between forming members 13 and 14. This first step of the operation partially forms the diaphragm into the proper shape by reason of stretching the same out of true alinement and compelling the same to conform partially to the curved faces of the disks 13 and 14. The upper cap 7 is now placed on top of flange 10 and bolted to said flange by means of cap screws 11. The fluid pressure is now admitted through the inlet pipe 24 into the lower chamber 5, and the formation of the diaphragm completed by the pressure of the fluid forcing the same up to the position shown in Fig. 1. The adjacent faces of flanges 9 and 10 are beveled away, as shown in Fig. 1, to provide a circumferential inwardly widening recess 27 to receive the marginal portion of the movable part of the diaphragm. The curved faces of the supporting members 13 and 14 are likewise so spaced from each other as to form a tapering recess 28. In operation the diaphragm moves from side to side of the walls of said recesses 27 and 28.

In Fig. 3 the diaphragm is shown in the lowest position with the air pressure still against the upper side thereof; in Fig. 2 the air pressure has just been admitted against the lower side of the diaphragm throwing the same against the upper wall of the tapered recess 28. The air pressure will then move the diaphragm supports up to the position shown in Fig. 1, the diaphragm itself being exposed to strain only along the narrow annular space between the mouths of recesses 27 and 28. The greater portion of the strain is removed from the diaphragm by providing sufficient slack metal in the diaphragm to permit same to move from wall to wall of the forming and supporting members 13 and 14 and not ruffle or kink the metal diaphragm. This is accomplished by constructing said members 13 and 14 a fraction of an inch smaller than the actual diameter of the chamber in which the diaphragm is to operate, the intervening diaphragm surface only, being subjected to continued tension of fluid pressure, the rest of the area of the diaphragm being supported by members 13 and 14.

Under actual test a diaphragm composed of three superimposed sheets of soft copper each No. 36 gage, has withstood 250,188 operations under air pressure ranging from twenty to 110 pounds per square inch, and is still in perfect condition. Under similar conditions a rubber diaphragm three-sixteenths of an inch thick reinforced with three-ply canvas, only withstood 6200 operations before its fiber began to break up. The rubber portion of this diaphragm also showed indications of disintegration from the action of the oil necessarily used.

The above test was made on a diaphragm the working area of which was four and one-half inches and the travel one-eighth of an inch.

I claim:

1. In a diaphragm device, a diaphragm, a pair of diaphragm supports, means to fasten said supports together on opposite sides of said diaphragm, one of said supports having a concave face and the other support having a convex face extending into said concave face, said diaphragm being adapted to make a free preliminary movement from one to the other of said faces and to conform to the face with which it is in contact.

2. In a diaphragm device, a diaphragm, and a pair of reciprocatory diaphragm supports having faces directed toward said diaphragm, said faces maintaining the said diaphragm in a constant convexity toward one of said supports and being separated to permit a limited vibration of the diaphragm independently of the supports.

3. In a diaphragm device, a diaphragm, and a pair of diaphragm supports having faces directed toward said diaphragm, said faces maintaining the said diaphragm in a constant convexity toward one of said supports, there being an outwardly widening space between said faces.

4. In combination, a casing, disk-like diaphragm supports adapted to reciprocate in said casing, a diaphragm inclosed within the casing and attached to the casing and forming a partition which divides the interior of said casing into two compartments, said supports being spaced apart to permit the diaphragm to have a limited vibration independently thereof, one of said supports being concaved and that portion of the diaphragm between the supports being dished, and means projecting from the diaphragm supports to the exterior of said casing to transmit movement to the parts controlled by the diaphragm.

5. In combination, a casing, disk-like diaphragm supports adapted to reciprocate in said casing, a diaphragm inclosed within the casing and attached to the casing and forming a partition which divides the interior of said casing into two compartments, said supports being spaced apart to permit the diaphragm to have a limited vibration independently thereof, one of said supports being concaved and that portion of the diaphragm between the supports being dished, and means projecting from the diaphragm supports to the exterior of said casing to transmit movement to the parts controlled by the diaphragm, and stop means limiting the movement of said supports to prevent said diaphragm from moving far enough to reverse the curvature thereof.

6. In a diaphragm device, a diaphragm chamber, a diaphragm dividing said chamber into compartments, said chamber having a circumferential recess to receive the marginal portion of the movable part of said diaphragm, and a pair of diaphragm supports having faces directed toward said diaphragm, one of the said faces being convex and the other being concave, said faces being adapted to form abutments to support said diaphragm against the fluid pressure and maintain the convexity of said diaphragm toward the same side thereof, the walls of said recess coöperating with the faces of said supports to form abutments for said diaphragm in its extreme travel in either direction to protect said diaphragm from the strain of fluid pressure thereagainst.

7. In a diaphragm device, a diaphragm, a support for the margin of said diaphragm, said support having a circumferential recess to receive said diaphragm, said recess having walls above and below said diaphragm which diverge toward the mouth of said recess, means for supporting the central portion of said diaphragm and forming an operative connection therefor, said means comprising a pair of forming disks between which said diaphragm is clamped, said disks having an outwardly widening space therebetween the walls of which form abutments for said diaphragm.

8. In a diaphragm device, a diaphragm, a marginal support for said diaphragm and a central support for said diaphragm, said supports being recessed to permit a preliminary, free movement of said diaphragm before the movement of said central support.

In testimony whereof I have hereunto signed my name in the presence of two subscribing witnesses at Los Angeles, in the county of Los Angeles and State of California, this 12th day of April 1912.

GUY CARLETON PIERCE.

Witnesses:
ALBERT H. MERRILL,
LILLIAN YOUNG.